US008327820B2

(12) United States Patent
Tradler

(10) Patent No.: US 8,327,820 B2
(45) Date of Patent: Dec. 11, 2012

(54) PRESSURE ENGINE, IN PARTICULAR, AN INTERNAL COMBUSTION ENGINE, WITH AN ANNULAR STRUCTURE

(76) Inventor: Alois Tradler, Traunstein-Wolkersdorf (DE)

( * ) Notice: Subject to any disclaimer, the term of this patent is extended or adjusted under 35 U.S.C. 154(b) by 871 days.

(21) Appl. No.: 12/443,104

(22) PCT Filed: Sep. 11, 2007

(86) PCT No.: PCT/EP2007/007919

§ 371 (c)(1),
(2), (4) Date: Mar. 26, 2009

(87) PCT Pub. No.: WO2008/037352

PCT Pub. Date: Apr. 3, 2008

(65) Prior Publication Data

US 2010/0006059 A1 Jan. 14, 2010

(30) Foreign Application Priority Data

Sep. 28, 2006 (DE) ......................... 10 2006 046 011

(51) Int. Cl.
*F02B 53/00* (2006.01)
*F02B 53/10* (2006.01)
*F02B 53/04* (2006.01)
*F01B 3/04* (2006.01)
*F01B 3/00* (2006.01)
*F02B 75/26* (2006.01)
*F01L 5/10* (2006.01)
*F16J 1/24* (2006.01)

(52) U.S. Cl. ...... 123/241; 123/205; 123/45 A; 123/45 R

(58) Field of Classification Search .................. 123/233, 123/45 R, 45 A, 205
See application file for complete search history.

(56) References Cited

U.S. PATENT DOCUMENTS 4,091,789 A * 5/1978 Jones ........................... 123/205
(Continued)

FOREIGN PATENT DOCUMENTS

AU 59802 86 A 1/1987
(Continued)

OTHER PUBLICATIONS

English Translation of Japanese Office Action for corresponding Japanese Application No. JP 2009-529564 dated Sep. 27, 2011.

(Continued)

*Primary Examiner* — Thomas Denion
*Assistant Examiner* — Cameron Setayesh
(74) *Attorney, Agent, or Firm* — Wood, Phillips, Katz, Clark & Mortimer

(57) ABSTRACT

The invention relates to a novel pressure engine, in particular an internal combustion engine which includes an annular structure, a driven shaft running along the annular axis, an annular housing with a housing wall and at least one rotating piston that rotates in the annular housing along a circuit in a sealed manner in relation to the housing. The piston is rotationally fixed to the driven shaft by a connection member and delimits a segment shaped combustion chamber that rotates with the piston, at least on the side lying in the rotation direction when viewed from the combustion chamber. The chamber has connections at given points on the annular housing to a compressed air supply and to an exhaust system. This piston has a piston housing which contains an inner piston which is pushed towards the combustion chamber by a pretensioning force.

13 Claims, 15 Drawing Sheets

U.S. PATENT DOCUMENTS

| | | | | | |
|---|---|---|---|---|---|
| 4,510,894 | A * | 4/1985 | Williams | 123/48 R |
| 4,558,669 | A * | 12/1985 | Kemp | 123/233 |
| 4,688,531 | A * | 8/1987 | Aase | 123/227 |
| 5,365,892 | A * | 11/1994 | Kienle | 123/44 D |
| 6,119,649 | A | 9/2000 | Raab | |
| 6,986,328 | B2 * | 1/2006 | Huettlin | 123/45 R |
| 7,341,041 | B2 * | 3/2008 | Pekau | 123/206 |
| 7,673,595 | B2 * | 3/2010 | Pelov | 123/44 D |
| 7,984,702 | B2 * | 7/2011 | Russell | 123/162 |
| 2001/0001362 | A1 * | 5/2001 | Gray, Jr. | 60/616 |
| 2004/0216702 | A1 * | 11/2004 | Teufl | 123/43 C |
| 2005/0066917 | A1 * | 3/2005 | Huettlin | 123/45 A |
| 2005/0263112 | A1 * | 12/2005 | Wei | 123/45 R |

FOREIGN PATENT DOCUMENTS

| | | | |
|---|---|---|---|
| BE | 823 161 | A1 | 12/1974 |
| DE | 1 810 346 | | 6/1970 |
| DE | 38 25 365 | A1 | 2/1990 |
| DE | 195 21 528 | B4 | 7/1996 |
| DE | 195 23 736 | A1 | 1/1997 |
| DE | 197 34 783 | C2 | 9/2001 |
| FR | 2 229 274 | A | 12/1974 |
| FR | 2 252 764 | A | 6/1975 |
| GB | 23036 | | 0/1915 |
| GB | 379 573 | A | 9/1932 |
| WO | WO 99/39090 | A | 8/1999 |

OTHER PUBLICATIONS

International Search Report issued during the international stage of the instant patent application (PCT/EP2007/007919) dated Feb. 20, 2008.

The International Preliminary Report on patentability issued for the corresponding patent application (PCT/EP2007/007919) dated May 19, 2009.

* cited by examiner

PRESSURE ENGINE, IN PARTICULAR, AN INTERNAL COMBUSTION ENGINE, WITH AN ANNULAR STRUCTURE

FIELD OF THE INVENTION

The invention relates to a pressure engine or pressure operated (power) engine with an annular structure, which comprises a driven shaft extending along the annular axis; an annular housing including a housing wall and at least one rotating piston rotating within the annular housing along a circular path in a sealed manner against the housing, the rotating piston being connected to the driven shaft through a connecting link in a rotationally fixed manner and delimiting within the annular housing a co-rotating, e.g. ring-segment-like pressure chamber at least on the side located in the direction of rotation as seen from the pressure chamber; connections, which are formed in predetermined positions of the annular housing, to a compressed-air supply, to a fuel supply in case of an internal combustion engine, and to an exhaust system. The invention relates in particular to an internal combustion engine. It is, however, well-known that internal combustion engines can also be put into motion by external pressure media, such as the Diesel-engine-like brine pump drive operated by water pressure, which is exhibited at the Salzmuseum (salt museum) Klaushäusl near Bernau, Germany. In this respect, the engine according to the invention may also be a pressure engine operated by an externally supplied pressure medium, in addition to an internal combustion engine.

BACKGROUND OF THE INVENTION

Internal combustion engines of the above-mentioned type are known from the German patent specification No. 195 21 528, for example, and similar rotating-piston-type internal combustion engines are disclosed in the following German patent-office publications: unexamined laid-open patent application No. 1 810 346, unexamined laid-open patent application No. 38 25 365, unexamined laid-open patent application No. 195 23 736, and patent specification No. 197 34 783. The common feature of the well-known rotating-piston engines is that they require a down-stream support of the explosion pressure, that is, control elements which are pushed into the annular cylinder chamber and are pulled out again from the cylinder chamber for the pass-by of the piston. The relevant mechanical system makes the engine complex, troublesome and susceptible to wear and results in an additional loss of efficiency and a high running noise level.

BRIEF SUMMARY OF THE INVENTION

The object of the invention is to provide a pressure engine, in particular an internal combustion engine, which runs in a wear-resistant, low-noise and substantially true manner and for which a high efficiency is also tried to be achieved. The engine according to the invention is characterized in that the rotating piston comprises a piston housing; and, within the piston housing, an internal piston pressed towards the pressure chamber, in particular the combustion chamber, by a pre-stressing force, which also supports oneself on the piston housing, the internal piston being linearly displaceable against the pre-stressing force in relation to the piston housing in a longitudinal direction of the piston, the line of displacement of the internal piston tangentially passing the axis of the driven shaft at a distance. In this case, the pressure or combustion chamber is delimited by the annular housing and the rotating piston and does not require any cut-off members which are continuously moved into and out of the annular housing. The annular housing is substantially comprised of an annular groove being open towards the inside of the ring, which is formed for the purpose that therein the rotating piston may slide while the pressure or combustion chamber which also rotates is closely sealed. Therefore, a low-noise, true and smooth run is obtained, which can be implemented for low space requirements and for a high efficiency. The operation characteristics of the engine can be optimized by selecting the area ratio between piston and annular housing in the pressure or combustion chamber and the distance between the piston-displacement line and the axis of the driven shaft.

Preferably, the internal piston loaded by the pre-stressing force is, in relation to the piston housing, subjected to an attenuation of movement for its forward stroke and for its return stroke which is caused by the pre-stressing force, such that the thrust force generated by the fuel combustion distributes in dependence on time and hard impacts are avoided. According to a useful design, the pre-stressing force is applied by one or more compression springs and the attenuation of movement is effected by a throttled displacement of a flow medium, in particular of hydraulic oil, within the piston housing. These are actually well-established technical measures. The internal piston should preferably consist of two coaxial piston elements which in particular have the same cross-sectional area and are fitted, at a distance from each other, to a common piston rod extending along the piston-displacement line. The first piston element, that is, the outer piston element in relation to the rotation of the driven shaft, is adjacent to the combustion chamber. In this design, the internal piston penetrates with its piston rod two chambers or volumes filled with a flow medium, which are connected to each other by at least one connecting channel having a reduced flow-through cross-sectional area, wherein, during the movement of the internal piston against the pre-stressing force, the first, outer piston element penetrates into the first volume and displaces the flow medium out of it and the second, in relation to the rotation of the driven shaft inner piston element withdraws from the second volume and vacates flow medium space. This design allows the required attenuation of movement to be achieved in a frictionless manner by throttling the flow. In detail, the piston is pushed downwards into the oil volume by the ignition process, the oil is now pressed into the lower oil volume through narrow channels, constituting the flow-through throttling means, and the second piston element having the same diameter as the first piston element, which is fitted to the lower end of the piston skirt sucks the same amount of oil into the lower volume. Thus the combustion pressure presses the piston head against the spring pressure and the throttle resistance, producing a torque in the direction of rotor rotation. The combustion pressure is therefore directly converted into a direction of rotation. The second piston element has, for the purpose of increased operational reliability, a closing face which closes the connecting channel(s) when the internal piston is in the final position in which it is pushed back by the pre-stressing force. To avoid impacts during the return stroke of the piston, a recess, in particular a groove, and a protrusion being complementary to the recess, in particular a rib, may be formed on the outer side (in relation to the rotation of the driven shaft), on the one hand, and respectively, on the other, at a face serving as an outer stop face for the second piston element, which delimits the second volume outwardly. The flow medium existing in the recess is displaced by the protrusion along the gap becoming narrower in front of the stop face and the flow medium thus acts as a throttle.

A particularly low-loss and low-wear run of the internal combustion engine is obtained if the internal piston travels in the piston housing, in its portion adjacent to the combustion chamber, on the inner wall of the piston housing in a non-contact manner with a narrow gap of 0.1 mm, for example, and is guided only by guide bushes having sealing rings on which the internal piston, namely the piston elements or the piston rod, acts in a sliding manner. Therefore, there are no oil scraper rings on the piston adjacent to the combustion chamber and the pressure loss caused by the existing gap is practically negligible. In addition, the internal piston may be designed in such a way that windows for the flow-through of cooling air are provided in the piston housing in the area between the first piston element in its first position and the second piston element in its outermost position and that the piston rod carries cooling fins in this area. Cooling of the, or each, rotating piston may limit thermal expansion and may therefore allow the above gap to be designed very narrow.

According to a simple, robust construction, the annular housing is a housing split in the axial direction, which is composed of a bowl-like portion and a cover portion, the drive shaft being supported in these portions, and in the circumferential area of the annular housing, at least one, but preferably multiple, working cycle length(s) is/are arranged in a number which does not necessarily depend on the number of the rotating pistons, and within the respective working cycle length, the annular housing comprises, along the direction of rotation, the following fittings: the connection in the form of a window for supplying the combustion chamber with compressed air; a recess for fuel injection; a spark plug; a connection in the form of a window for removing exhaust gases; and connections in the form of windows for passing through scavenging and cooling fresh air, the window for supplying the combustion chamber with compressed air, the recess for fuel injection, the connection for removing exhaust gases, and the connections for passing through scavenging and cooling fresh air in the housing wall each being opened and closed by the rotation movement of the rotating piston(s) for passing or blocking. The distance between the window for supplying compressed air and the recess for fuel injection or the spark plug exceeds the circumferential dimension of the rotating piston, the distance between the recess for fuel injection and the spark plug ranges from zero to the circumferential dimension of the rotating piston (the recess for fuel injection and the spark plug may also have the same axial distance but may circumferentially be offset from each other, or the spark plug may be arranged in front of the recess), the connection for removing exhaust gases has a size in the order of the circumferential dimension of the rotating piston, and the connections for passing through scavenging and cooling fresh air have a size in the direction of rotation in the order of the distance between two rotating pistons in the circumferential area.

An improved afterburning of possible residual gases leaving the combustion chamber unburned is effected by branching off, from a compressed-air line connected to the window for supplying the combustion chamber with compressed air, or from an area of this window, a line leading in an afterburning chamber connecting, in relation to flow, to the connection for removing exhaust gases.

The design of the internal combustion engine may be easily expanded by multiplication, e.g. by circumferentially arranging in the annular housing a larger number of rotating pistons connected to the driven shaft, preferably at equal angular distances, and by allowing them altogether to form a rotor; by fitting a plurality of parallel rotors to the driven shaft in tandem in the axial direction, the pistons of the rotors each running in one annular housing; or by arranging a plurality of annular housings around the driven shaft in tandem in the axial direction, one of the rotating pistons rotating in each of the annular housings, the rotating pistons being connected to the driven shaft through a separate connecting link.

If more than one rotating piston is present, the operation in the case of partial load or also in the case of failure of one of the rotating pistons may be continued with less rotating pistons without producing substantial losses due to direction reversals, unbalance and useless friction. In this case, a synchronisation control system controls the fuel supply in dependence on the rotary phase of the rotating piston, and if a plurality of rotating pistons is present, it may selectively lock the fuel supply for some of them. To provide a fail-safe system, the oil-filled volumes of each rotating piston may be connected to a flow-medium reservoir which comprises an air and vent valve and includes a sensor which issues a signal in the case that a lack of flow medium arises from a damage, and by this signal, the fuel supply can also be switched off so that damage due to the lack of flow medium is avoided in respective rotating pistons. The signal transmission from the rotor to the sensor is preferably done by means of magnetic fields generated by permanent magnets so that the rotor does not need any power supply.

BRIEF DESCRIPTION OF THE DRAWINGS

Further details, advantages and modifications of the invention will appear from the following description of preferred embodiments of internal combustion engines according to the invention with reference to the drawings, in which.

DETAILED DESCRIPTION OF THE PREFERRED EMBODIMENTS

Figure 1:
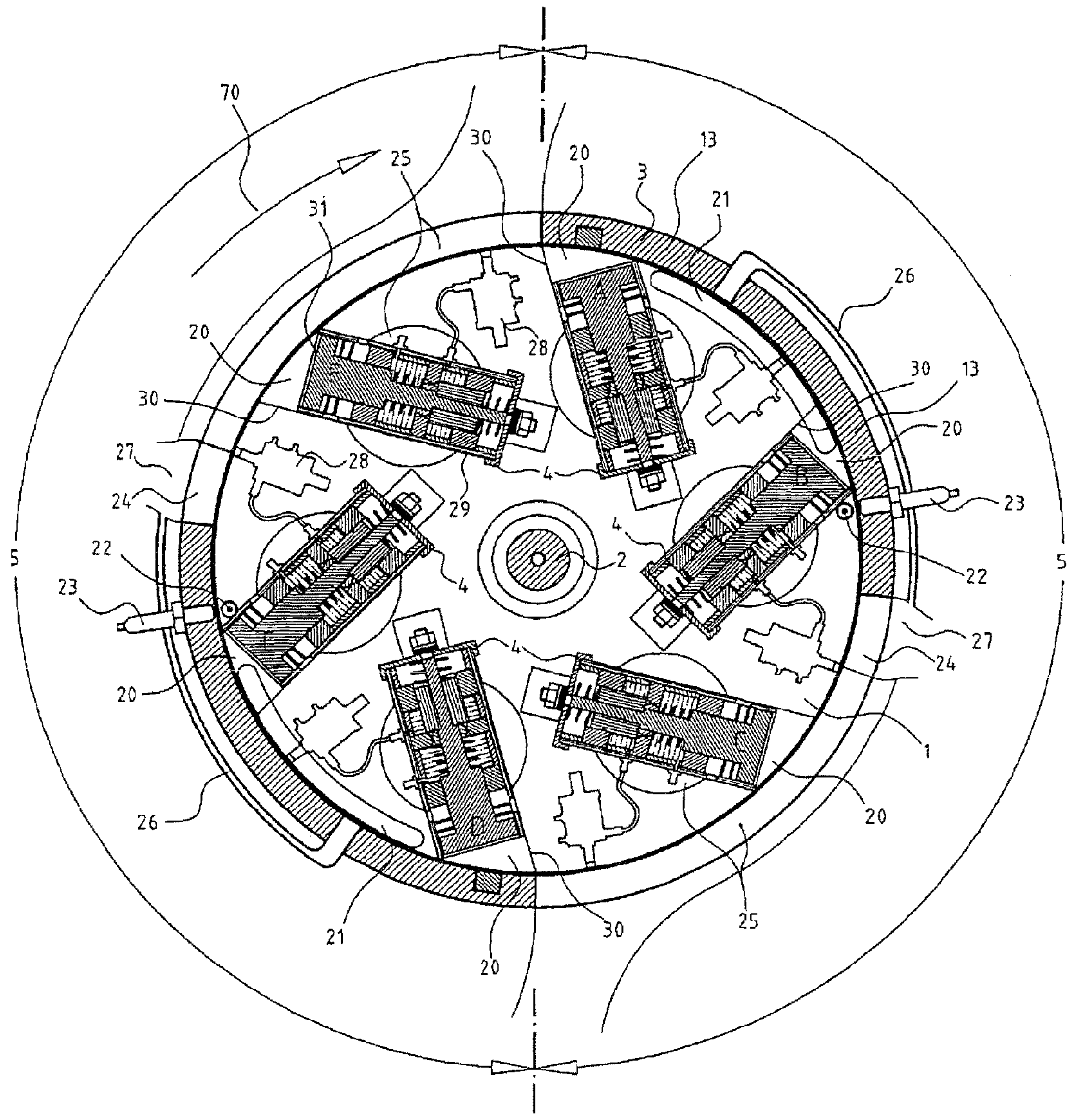
FIG. 1 shows a schematic cross-sectional view of an internal combustion engine having six rotating pistons, two of which being in the working cycle of ignition after loading with compressed air and introduction of fuel.

FIGS. 1 to 6 show the key components of a six-piston internal combustion engine according to the invention in different working cycles in a cross-sectional view. The engine components shown include a rotor 1 which is fixed, in a rotationally fixed manner, to an engine's driven shaft 2 determining the rotation axis of the rotor; and a stator 3 which is stationary or is fixed to the housing. In the example of FIG. 1, the rotor 1 includes six rotating pistons 4 which are denoted by A to F one after the other. The stator 3 has a disc or annular structure and its groove-like or tape-ring-like external surface approximately corresponds to the "cylinder" of a reciprocating internal combustion engine. In the example shown, the stator includes two working cycle lengths 5 having a repeating structure along the inner circumference of the stator 3. The number of the working cycle lengths can be compared to the number of poles of electric motors. A larger number of working cycle lengths 5 results in a larger number of ignitions and ignition-mixture combustions per rotation but it results in smaller dimensions of the combustion chambers, depending on the design. In this respect, an optimization of the engine output is to be performed for the intended purpose in dependence on the conditions of the individual case. In any case, the number of the working cycle lengths 5 is not a direct function of the number of the rotating pistons 4. In the example of six pistons, which is shown in FIGS. 1 to 6, a single working cycle length might extend over the entire inner circumference of the stator 3, or in the example of two working cycle lengths 5, four or five rotating pistons might be present. If the number of pistons is even and if they are arranged at equal angular distances, the run will be slightly more discontinuous, as the explosions at the opposite working cycle lengths generally occur at the same time. Although the equal angular distances suggest themselves, they are not necessary. In addition, the ignition times may be slightly offset from each other.

First, the explanation of the structure of the engine will be completed with reference to FIGS. 7 and 8 before the working cycles shown in FIGS. 1 to 6 will be described.

Figure 2:
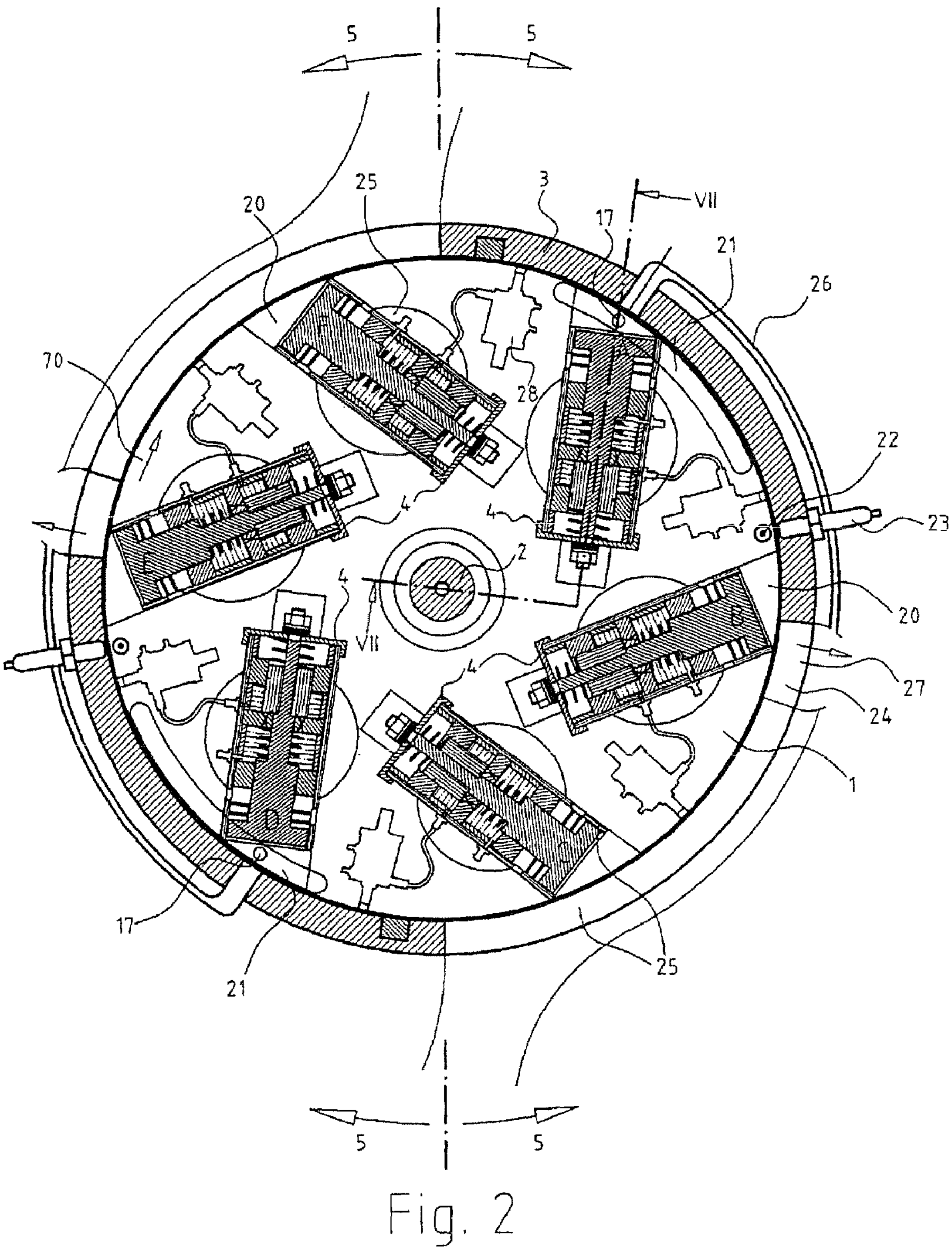
FIG. 2 shows a cross-section in the cutting plane II-II in FIG. 7 according to FIG. 1 in a later working cycle.
Figure 4:
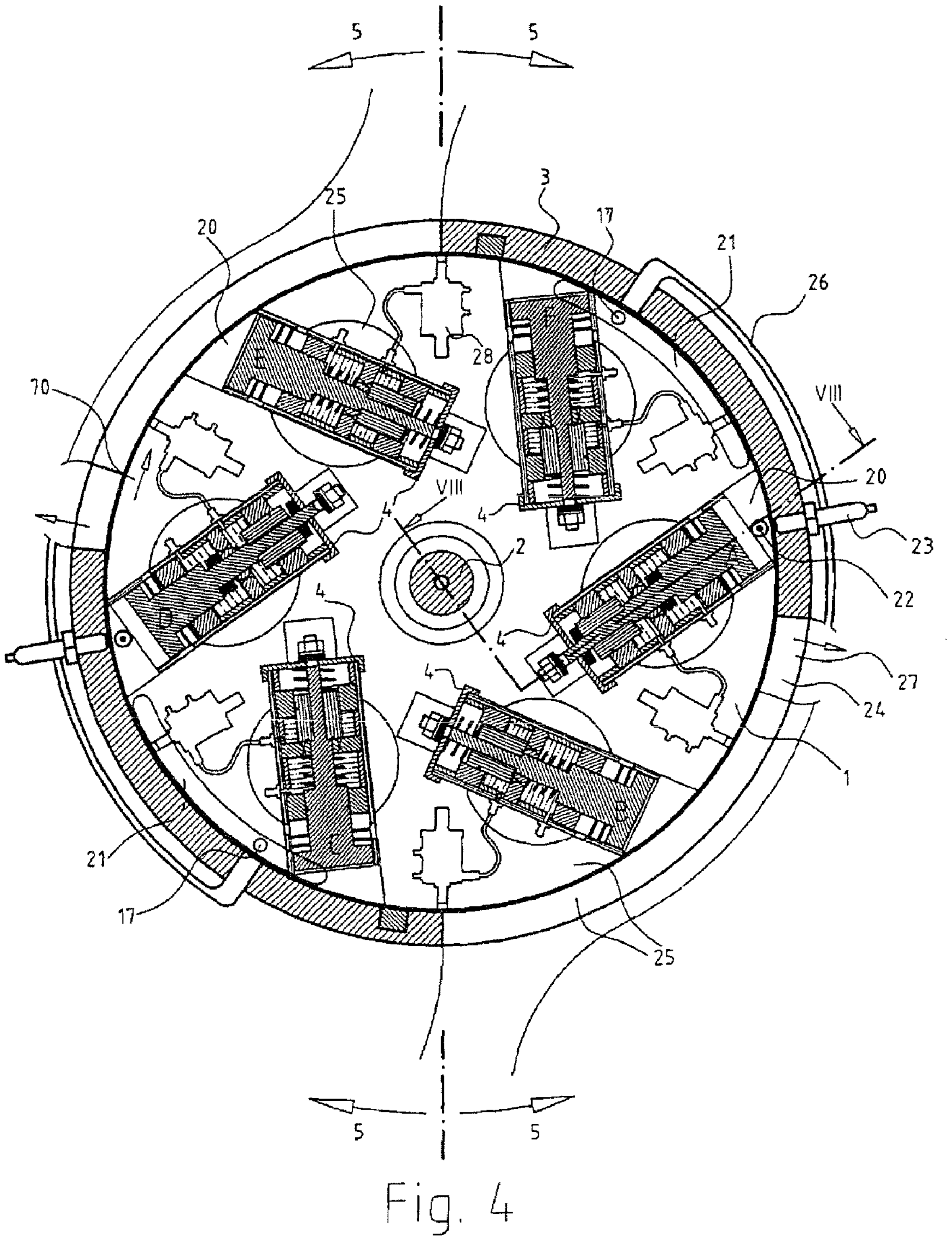
Figure 7:
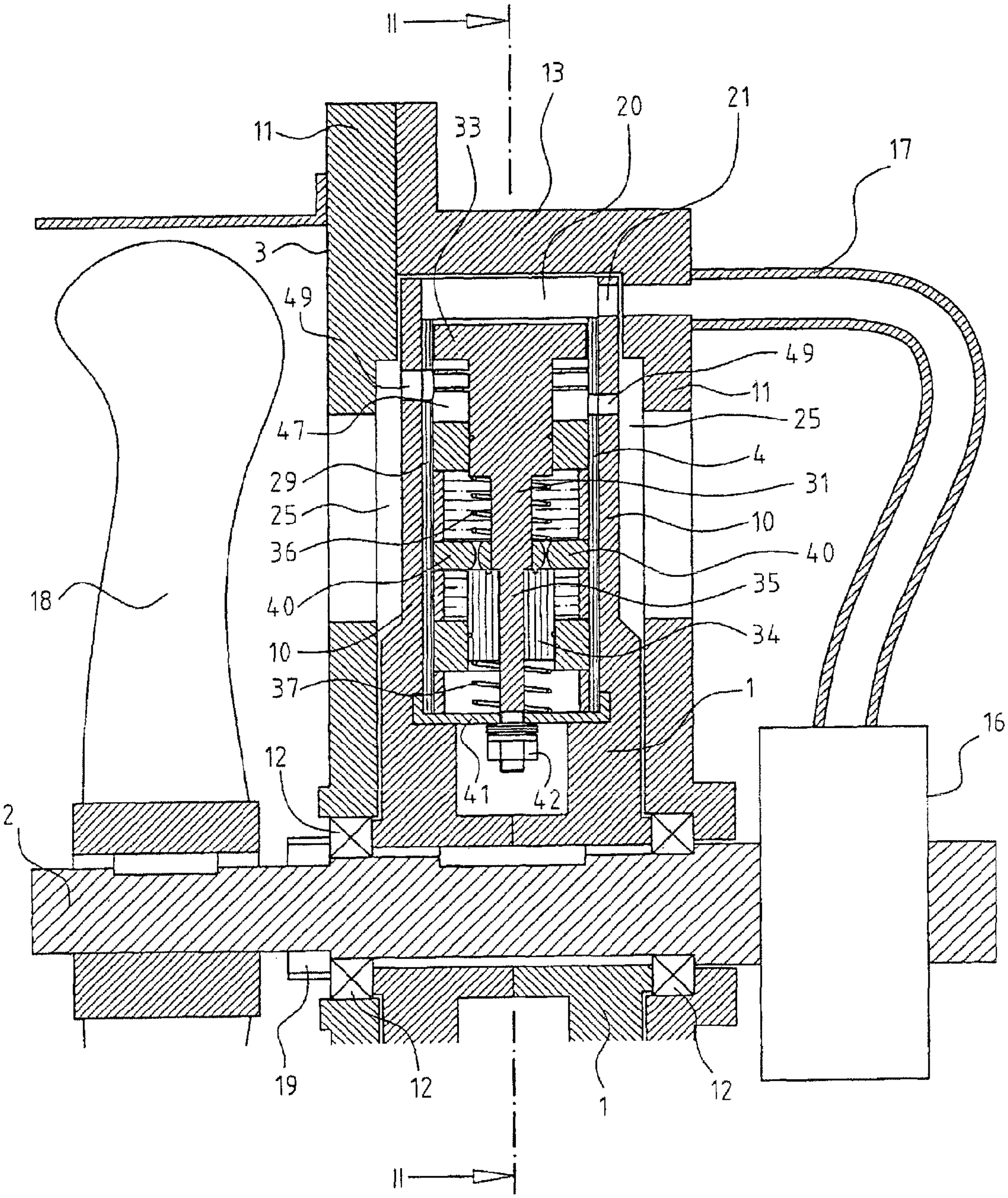
FIG. 7 shows a longitudinal section in a buckled plane VII-VII in FIG. 2.
Figure 8:
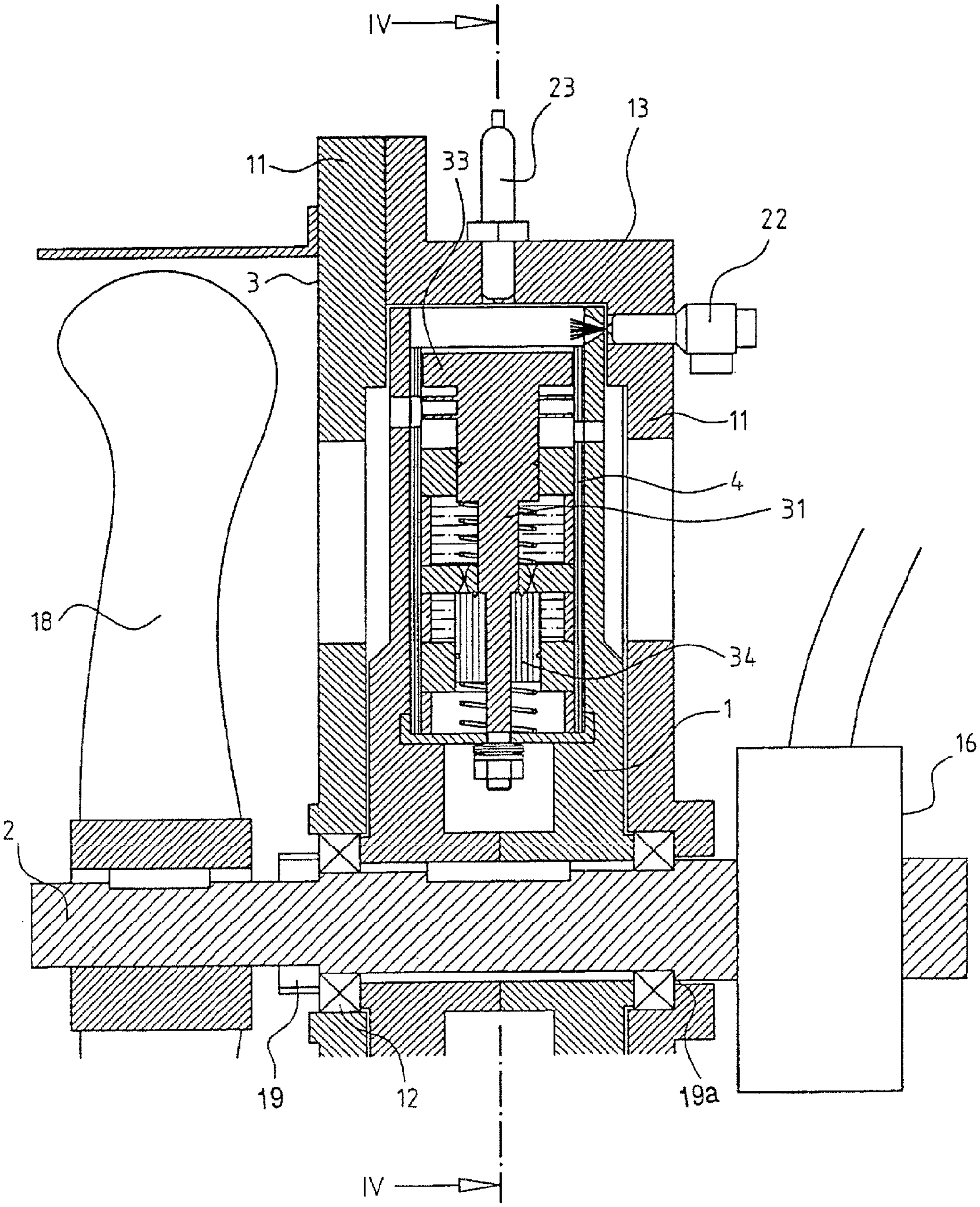
FIG. 8 shows a longitudinal section in a buckled plane VIII-VIII in FIG. 4.

FIGS. 7 and 8 show the engine in an axial longitudinal section in buckled cutting planes drawn in FIG. 2 and FIG. 4, respectively. The rotating piston 4 is not aligned with the axis of the shaft 2, as FIG. 4 suggests on the first look, but it tangentially passes the shaft 2. The connection of the rotating pistons 4 to the shaft 2 is established by side walls 10 of the rotor 1, which are keyed to the shaft. The side walls 10 have a plurality of apertures to pass air flows and they may be spoke sections, for example. According to a modification, a side wall is provided only on one side, to which the components of the rotor 1 are fixed. Outside of the side walls 10 of the rotor 1, side walls 11 of the stator 3 extend. In these side walls 11, the shaft 2 is supported by bearings 12. The radial external surface of the stator 3 is formed by a cylindrical outer wall 13. Between the side walls 10 and 11, narrow air gaps of e.g. 0.1 mm in width are provided so that the rotor 1 and the stator 3 can be rotated against each other in a non-contact and oil-free manner.

An air compressor 16 which also includes a rotor and a stator is fitted to the shaft 2 and has a rigid connection to the stator 3. The air compressor 16 externally performs the air compression for the fuel mixture, which, in reciprocating internal combustion engines, is usually effected by a stroke of the reciprocating piston. The compressor 16 is connected through compressed-air lines 17 to both the relevant points of the stator 3 in the respective working cycle lengths 5. In addition, an air compressor 18 shown as a fan blade, which is explained later, is fitted to the shaft 2. Along with a shaft shoulder 19*a*, an opposite bearing adjustment ring 19 screwed onto the shaft 2 determines the axial position of the rotor and stator on the shaft.

Each rotating piston 4 encloses, on its radial external surface and on the wall portions of the stator 3, a closed chamber which is the combustion chamber 20 of the respective piston and obtains connection to external flow paths by passing windows in the stator in respective phases of the combustion cycle so that it is not fully closed in these phases. As FIGS. 1 to 6 show, each working cycle length 5 includes in the direction of rotation in tandem a window 21 communicating with the compressed-air line 17 for supplying the combustion chamber 20 with compressed air (FIG. 2); a recess 22 for fuel injection (FIG. 1); a spark plug 23; a connection in the form of a window 24 for removing exhaust gases; and connections in the form of windows 25 for passing through scavenging and cooling fresh air. The windows 25 are formed in the side walls 10 and in the outer wall 13 and allow an effective scavenge. The dimensions and distances of these windows and components are matched with the circumferential lengths of the combustion chamber 20 and of the working cycle length 5. The window 21 should be as long as possible to maintain the high pressure in the combustion chamber, which drops through the gaps between the components, until the ignition time as completely as possible. Between the window 21 for the supply of compressed air and the spark plug 23, a corridor is provided whose length exceeds the, with respect to the rotor and stator, circumferential dimension of the rotating piston 4. Between the recess 22 for fuel injection and the spark plug 23, an angular distance is provided, which is shorter than the combustion chamber 20 and is hence shorter than the circumferential dimension of the rotating piston 4 (in the embodiment shown, they have the same angular position). The window 24 for removing exhaust gases has a size in the order of the combustion chamber 20, and the windows 25 for passing through scavenging and cooling fresh air have, in the circumferential direction, a size in the order of the space between two rotating pistons 4 in the circumferential area or have a larger size. In the embodiment shown, the window 21 and the recess 22 are formed in one of the side walls 11, the spark plug is screwed in the outer wall 13, the window 24 is also formed in the outer wall 13 and the windows 25 are arranged on opposite sides of the side walls 11 of both sides so that the air in these positions can go through the stator in the axial direction. The windows 25 are also longer than the combustion chamber 20 and thus effect scavenging and cooling of the rotating pistons 4 and of the rotor portions provided between the rotating pistons 4, which are open on the sides in this area. The air for scavenging and cooling comes from the compressor 18 shown in FIGS. 7 and 8, but its compression ratio may be lower than that of the compressor 16, or the air may be supplied by the compressor 16 as well. In the embodiment shown, the compressor 18 is a fan fitted to the shaft 2, which presses the scavenging and cooling air through the system.

From the area of the window 21, a second compressed-air line 26 branches, which leads to an afterburning chamber 27 adjacent to the window 24 for exhaust gases. In the embodiment shown in FIG. 5, a fail-safe unit 28 which will be later described in detail is allocated to each rotating piston 4.

In the embodiment appearing from FIGS. 7 and 8, the annular housing of the stator, which has the two side walls 11 and the outer wall 13, is designed in the form of a bowl with a cover, that is, the side wall 11 which is shown on the right side of the drawing, together with the outer wall 13 constitute the "bowl" and the side wall 11 shown on the left side constitutes the "cover", which are screwed together through radial flanges. Therefore, the rotor 1 is easy to mount.

Figure 9:
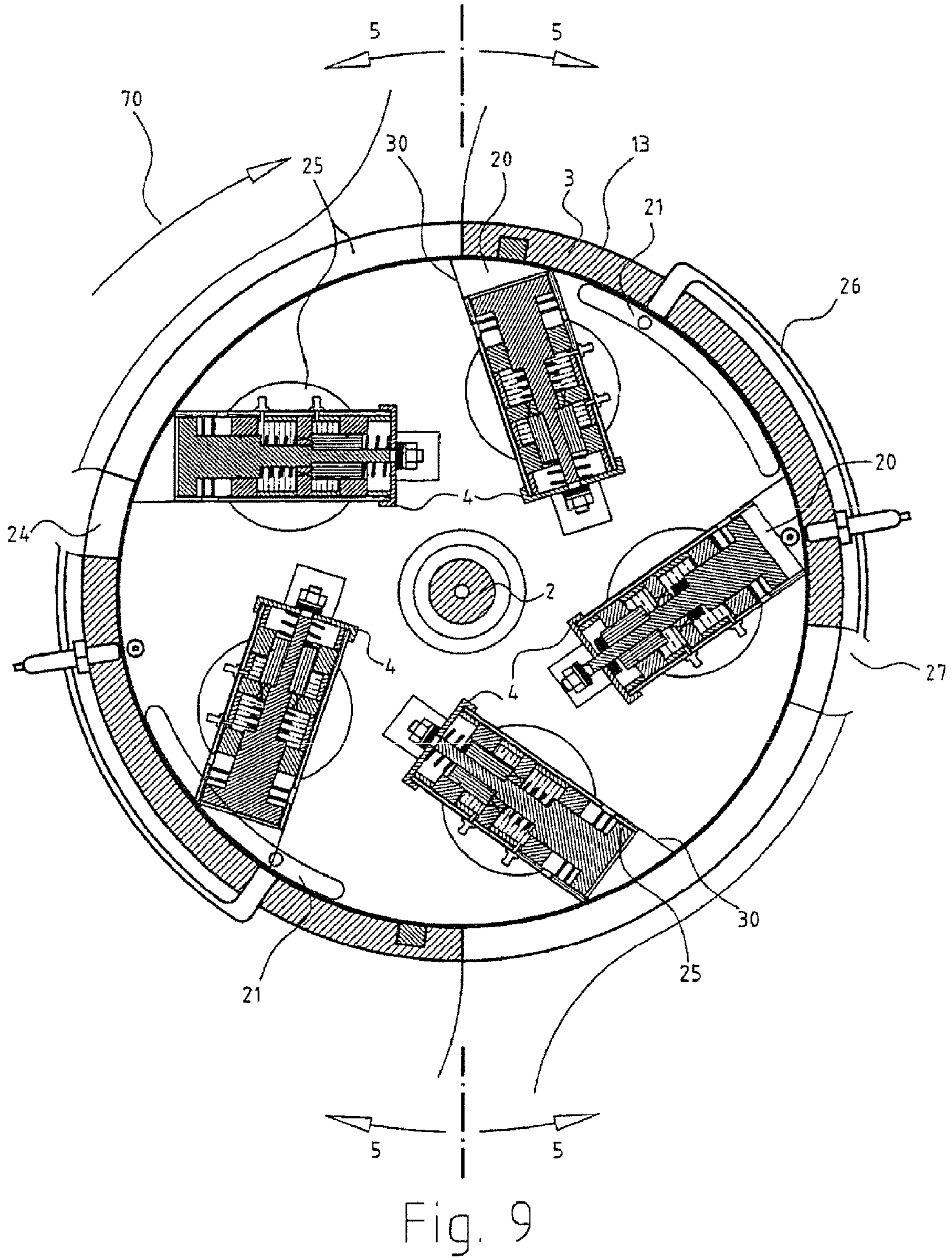
FIG. 9 shows a cross-section, according to FIG. 1, of a modified internal combustion engine, i.e. having five rotating pistons.

The number of the rotating pistons which is six in the above description is only exemplary, and FIG. 9 shows an internal combustion engine having five rotating pistons along the circumference of the shaft. The operating principle of this engine is similar to the engine having six pistons, but due to the odd number of pistons and hence the generally different times of ignition on the opposite spark plugs 23, the run of this engine is even smoother altogether, as only one rotating pistons ignites at a time, i.e. in the phase shown, the rotating piston on the right side of the figure. The difference between the embodiment according to FIG. 9 and that of FIGS. 1 to 6 is that the fail-safe units 28 are omitted for the purpose of a simpler design.

Figure 10:
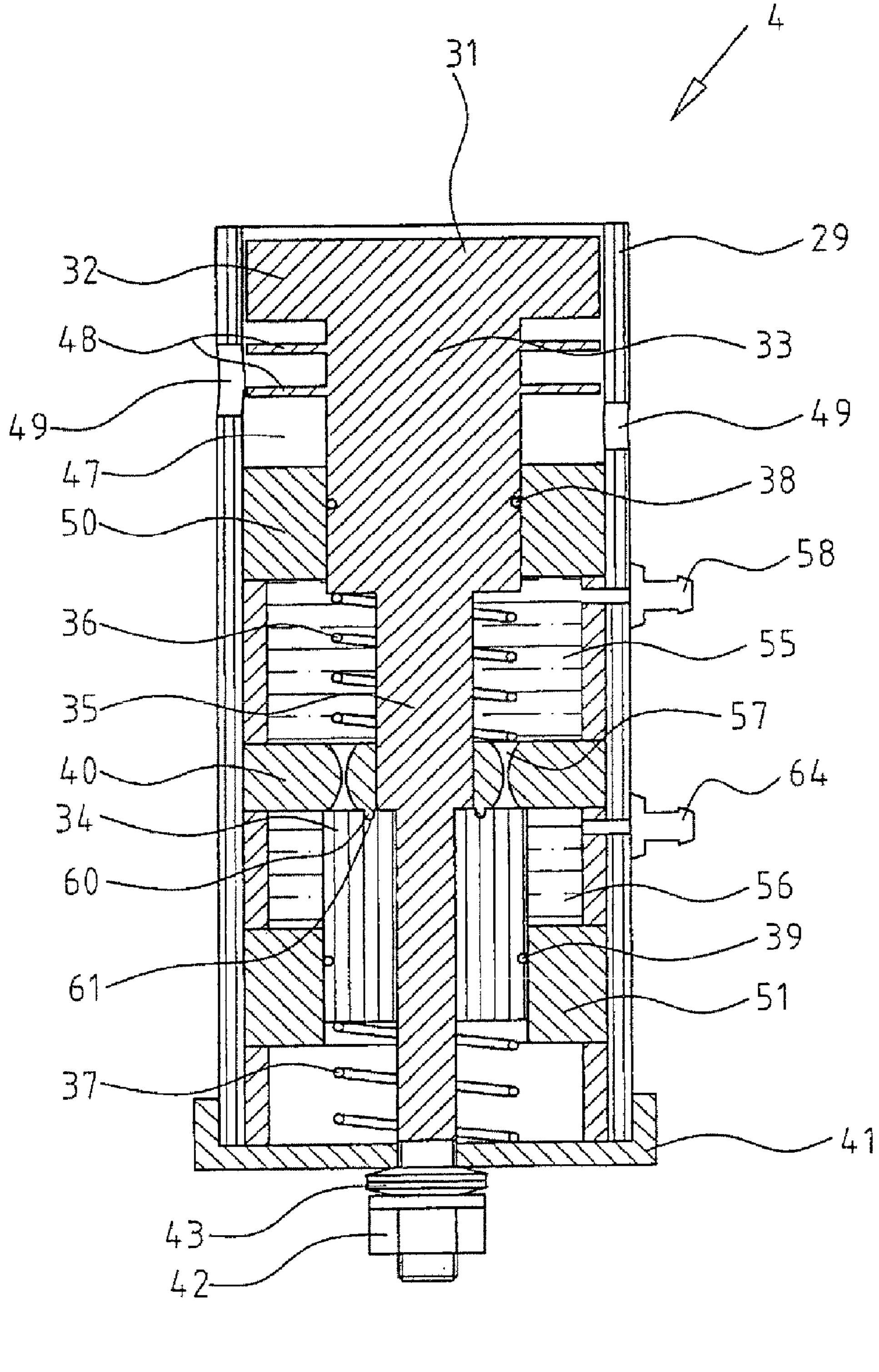
FIG. 10 shows a sectional view of one of the rotating pistons in the longitudinal direction of the rotating piston.
Figure 11:
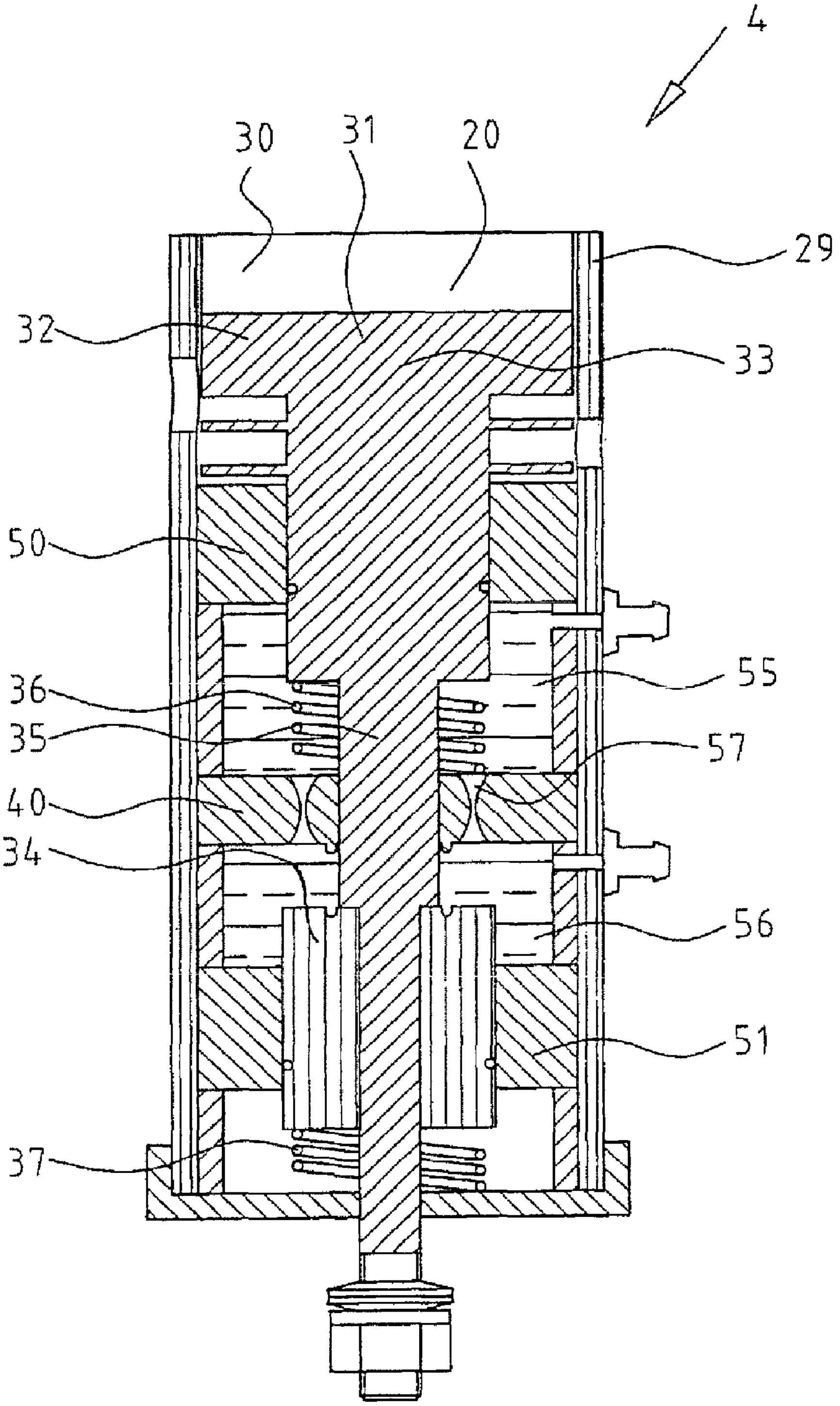
FIG. 11 shows a sectional view according to FIG. 10 in the working cycle which is also shown in FIG. 4.

The structure of the respective rotating pistons 4 which are mounted between the side walls 10 of the rotor 1 particularly appears from FIGS. 10 and 11. A piston housing 29 rigidly connected to the side walls 10 of the rotor, which has a cylindrical, rectangular or other circumferential shape, depending on the shape of the combustion chamber 10, comprises a wall extension 30 (FIGS. 1 to 6), which delimits the combustion chamber 20 on its back, on the side of the piston housing 29, which faces the outer wall 13 of the stator 3 and follows the direction of rotation. In the piston housing 29, an internal piston 31 is arranged in a slidable manner. The internal piston 31 delimits the combustion chamber 10 by a piston head 32 from the internal surfaces of the annular housing of the stator 3. The internal piston consists of two piston elements, which are hereinafter referred to as “upper piston” 33 and “lower piston” 34 following the representation in FIGS. 10 and 11, are coaxially arranged in tandem and are connected to each other by a piston rod 35. The upper piston 33 in its inner portion, which is tapered with respect to the piston head, and the lower piston 34 have the same cross-sectional area and, in the embodiment described, also have the same cross-sectional shape. In the embodiment shown, they are pressed by two helical compression springs 36 and 37 outwardly in the direction towards the combustion chamber 20, the springs 36 and 37 supporting themselves on a spacer ring 40 fixed to the piston housing and on an inner housing cover 41, respectively. The fact that the number of the springs 36 and 37 is two has the only reason of simpler design to achieve the desired level of the total spring stiffness in the space available. Of course, instead of individual coaxial helical compression springs, other elastic-energy storage devices may also be used as resilient structures, such as wreaths of parallel helical compression springs of smaller diameters or, if the other requirements are fulfilled, pneumatic springs, for example. The spring force of the springs 36 and 37 is dimensioned in such a way that they, as return springs, effect a restoration of the internal piston 31 but do not completely consume the entire driving force of the explosion in the combustion chamber. Oil scraper rings 38 and 39 are fixed to the external surfaces of the upper piston 33 and the lower piston 34, respectively. The piston rod 35 does not only connect the two piston elements 33 and 34 but also protrudes from the lower piston 34 inwardly (in the lower part of the figure) and penetrates the housing cover 41. Nuts 42 for adjusting the spring force and disc springs 43 as a safety stop are fixed to the internal end of the piston rod 35.

The upper piston 33 is tapered below the piston head 32 where a space 47 for cooling the internal piston is provided. The tapered portion of the piston carries cooling fins 48 and the piston housing comprises windows 49 through which a cooling-air flow can pass. In addition, the tapered portion of the piston runs in an external guide bush 50 in a sealed manner and the lower piston 34 runs in an internal guide bush 51, the terms “external” and “internal” referring to the rotation of the shaft 2 and that of the rotor 1, respectively. Between the guide bushes 50 and 51, two oil-filled volumes 55 and 56 are provided in the piston housing 29, which are separated from each other by the spacer ring 40 but may be connected to each other through connecting channels 57. If the lower piston 34 bears against the spacer ring 40, it closes the connecting channels 57 and if it lifts off from the spacer ring 40 against the spring force, the volumes are connected in a throttled manner with respect to flow. The oil scraper rings 38 and 39 between the upper piston 33 and the external guide bush 50 and between the lower piston 34 and the internal guide bush 51, respectively, seal the totality of the oil-filled volumes 55 and 56 outwardly. A vent valve 58 is adjacent to the volume 55.

The spacer ring 40 provided slightly off-centre between the guide bushes 50 and 51 in the piston housing 29 has multiple functions: it separates the volumes 55 and 56 while maintaining the connecting channels 57; it serves as a counter-support for the compression spring 36 pressing from the inside against the upper piston 33; it constitutes, for the lower piston 34, the external stop against which it is pressed by the compression springs 36 and 37; and it attenuates the impact of the lower piston 34 during its movement from the inside outwardly by an annular rib 60 spaced apart from the spacer ring 40 towards the lower piston 34, the annular rib 60 facing a complementary annular groove 61 in the lower piston.

The operating principle of the internal combustion engine described above will be explained below, but only the operations in a single one of the rotating pistons 4, namely the piston A, will be described at first with reference to FIGS. 1 to 6.

Figure 3:
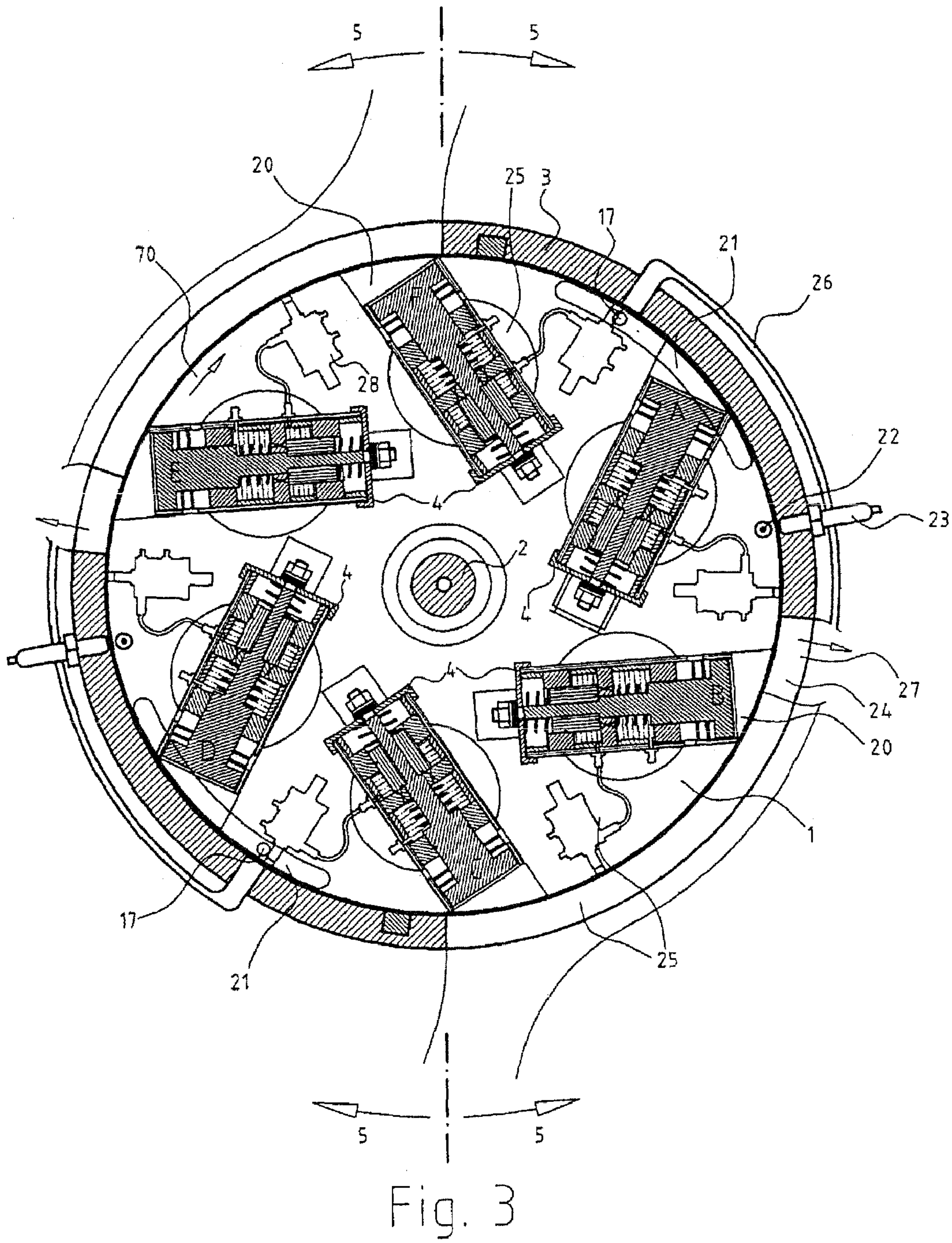
FIGS. 3 to 6 show cross-sections according to FIGS. 1 and 2 in further later working cycles.
Figure 5:
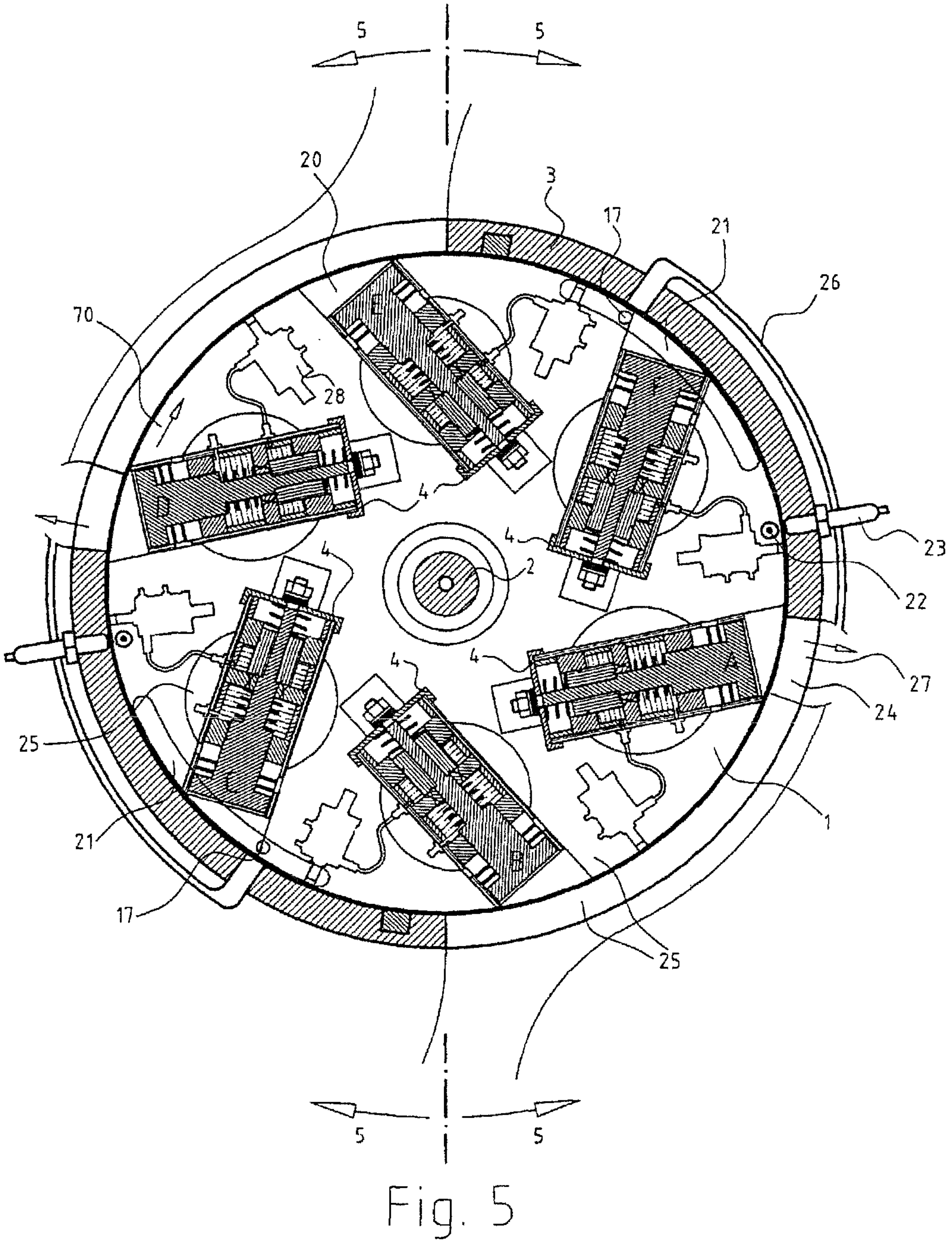

The rotor rotates in a direction indicated by a rotation direction arrow 70. In FIG. 1, the combustion chamber 20 of the piston A is still pressureless but is already closed. According to FIG. 2, the combustion chamber 20 runs along the window 21 for the supply of compressed air and is supercharged thereby. The condition of the rotating piston 4 is that of FIG. 10. In FIG. 3, the connection to the compressed air continues to exist. FIG. 4 shows a condition in which the combustion chamber 20 of the piston A is separated from the window 21 and is located in the area of the fuel recess 22 and of the spark plug 23, the pressed-down condition of the internal piston 31 indicating that the ignition has already occurred. That is, supercharging the combustion chamber 20 with compressed air was followed by the moment of ignition of the fuel mixture, and after the ignition process, the internal piston 31 was moved downwards due to the pressure on the piston head 32 as is illustrated in FIG. 11. In this case, the oil of the upper oil volume 55 is pressed through the narrow connecting channels 57 into the chamber of the lower oil volume 56 and the compression springs 36 and 37 are compressed. The force by the gas pressure of the fuel-air mixture is converted by the piston head 32 through the resistance of the springs 36 and 37 and by pressing the oil through the channels 57 as well as the thrust, which additionally acts, into a movement of the rotor in the direction of rotation. After this operation, the combustion chamber 20 of the piston A enters the area of the exhaust-gas window 24, as FIG. 5 shows, and the springs 36 and 37 press the internal piston 31 back outwardly again when the pressure in the combustion chamber 20 begins to decrease. When the lower piston 43 hits the spacer ring 40, an excessively hard shock is avoided by the resistance counteracting the back flow of the oil through the channels 57, on the one hand, and just before the zero point, by the penetration of the annular rib 60 into the oil-filled annular groove 61, on the other. As the rotor 1, the piston housing 29 and the piston head 31 carry no seals and operate with an allowance which is as small as possible, friction and wear are minimized during these movements of the internal piston and during the rotation of the rotor.

Figure 6:
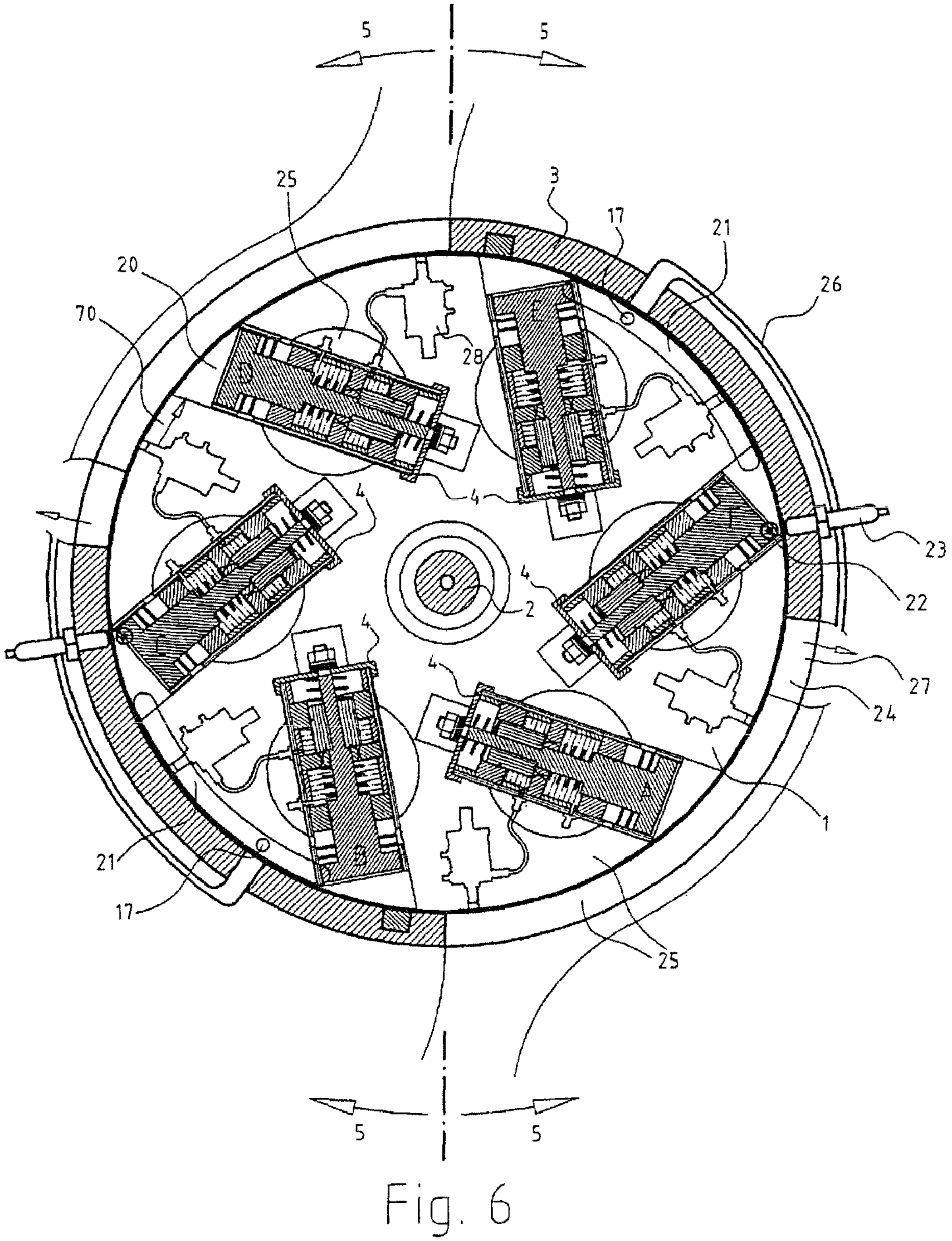

In more detail and under consideration of all of the six rotating pistons 4 denoted by the letters A, B, C, D, E and F, the working cycles or clocks occurring during the rotation of the rotor 1 will be described with reference to FIGS. 1 to 6. First, the combustion chambers 20 of the pistons A and D have been supercharged with air of high pressure to prepare the ignition, and now the injection of the fuel into the combustion chambers 20 and then, for A and D simultaneously or slightly offset in time, the ignition of the fuel-air mixture by means of the spark plugs 23 are effected by a control system (not shown) according to the phase illustrated in FIG. 4, whereupon the pistons A and D leave the "corridor" and approach the window 24 for the exhaust system, whereas the pistons C and F are located in the cooling and scavenging section. That is, in the phase illustrated in FIG. 5, the pistons A and D are connected to the exhaust-system window 24, the pressure in the two combustion chambers 20 breaks down and the internal pistons 31 of the rotating piston 4 return to their home positions. This is followed by a phase shown in FIG. 6, in which these pistons are connected to the respective window 25 in the cooling and air-scavenging section, whereas the combustion chambers of the pistons B and E are connected to the window 21, by the fact that the advancing edge of the piston head 31 clears the window 21, and are supercharged with compressed air, and the pistons C and F enter the ignition area. In addition, the compressed air is conducted, namely at first mainly, through the second compressed-air line 26 to the afterburning chamber 27 to supply it with oxygen for afterburning of fuel residues which have not been burnt. During the further rotation of the rotor, the opening leading to this line 26 is closed again and the combustion chamber 20 fills with compressed air. FIG. 6 also illustrates the cooling and air scavenging of the pistons A and D, and FIG. 2 illustrates the connection of the pistons B and E to the exhaust system and the condition of the pistons A and D in which they have opened the respective second compressed-air line 26 and allow afterburning air to flow towards the afterburning chamber 27. As long as the windows 25 for the scavenging and cooling air are clear, the rotating pistons are cooled while the combustion chamber 20 continues to slide in their external area in a pressureless manner until the combustion chamber 20 arrives at the next window 21. The operations described above are repeated again inside the rotating pistons 4. The rotors 1, and together with them the combustion chambers 20, continue to rotate.

When the rotor completes the passage through the working cycle length 5 described, the combustion chamber of the piston A arrives at the ignition area of the next working cycle length 5 (not shown separately), which is offset by 180° with respect to FIG. 1, and then enters the ignition area and comes into a condition in which A is located at the exhaust-system window 24 of the second working cycle length and receives, in its afterburning chamber 27, afterburning air discharged by B, C is located in the cooling and air-scavenging section, D leaves the window 21 for compressed air and enters the fuel and ignition area and E begins to leave the cooling and air-scavenging section and enters the corridor.

In the embodiment shown, each of the combustion chambers 20 is mainly delimited by three faces, that is, by the walls 11 and 13 of the stator housing, by the piston head 32 and by the wall extension 30. In so far as the explosion pressure acts on the face of the piston head 32, it is a positive pressure component. In so far as it acts on the wall extension 30, it is a negative component, as it acts against the direction of rotation, and this negative component must be subtracted from the positive component. The pressure on the outer wall 13 of the stator housing constitutes the counter-pressure for effecting the piston movement. The amount of the negative component depends on the general dimensioning of the engine components and on the tilt of the rotating pistons to the radius of the rotor and stator, and the operating conditions may be optimized by the design of the combustion chamber 20 and of the piston head 32. For example, for a quadrangular piston head, the area loaded by the explosion pressure can be increased by more than 20% in comparison with that of a circular piston head without increasing the negative component.

The control of fuel injection and ignition at the respective optimum times in dependence on the rotary phase of the rotor is not shown and described in detail, as these techniques are well-known per se.

Figure 12:
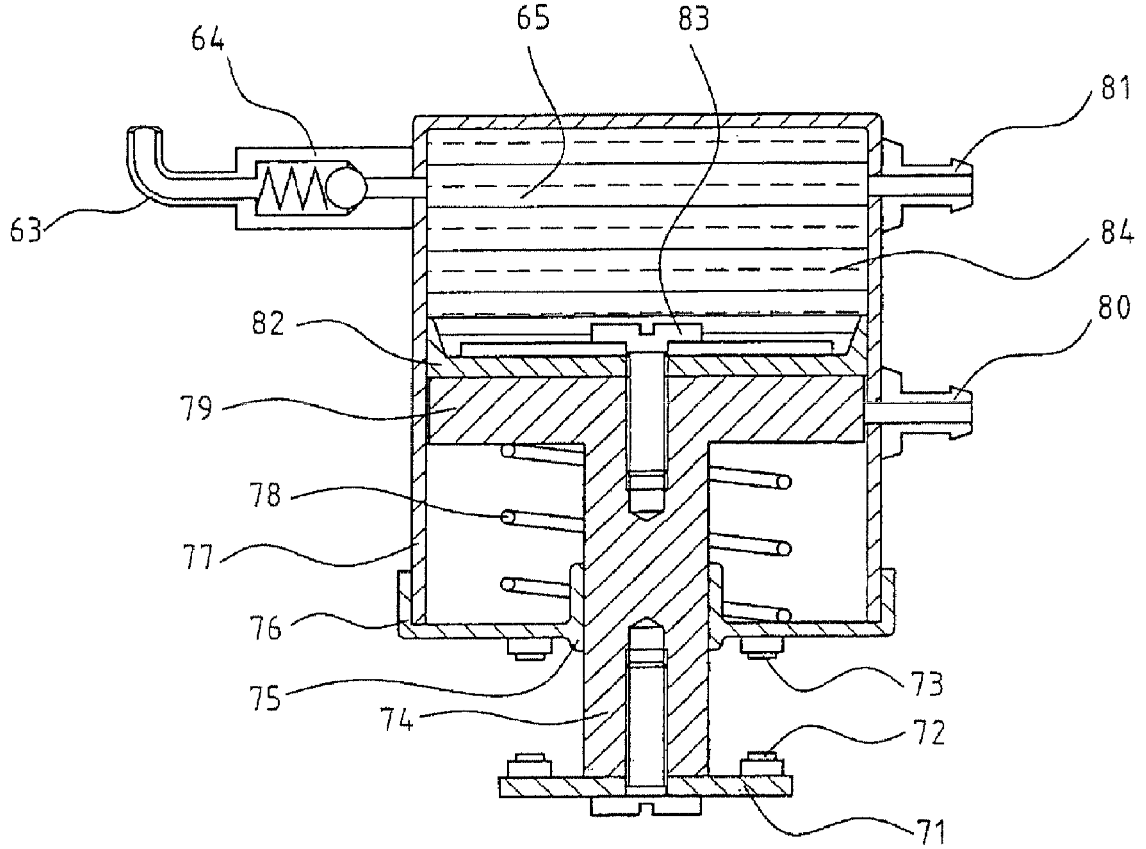
FIGS. 12 and 13 show sectional views of different embodiments of a fail-safe unit.
Figure 13:
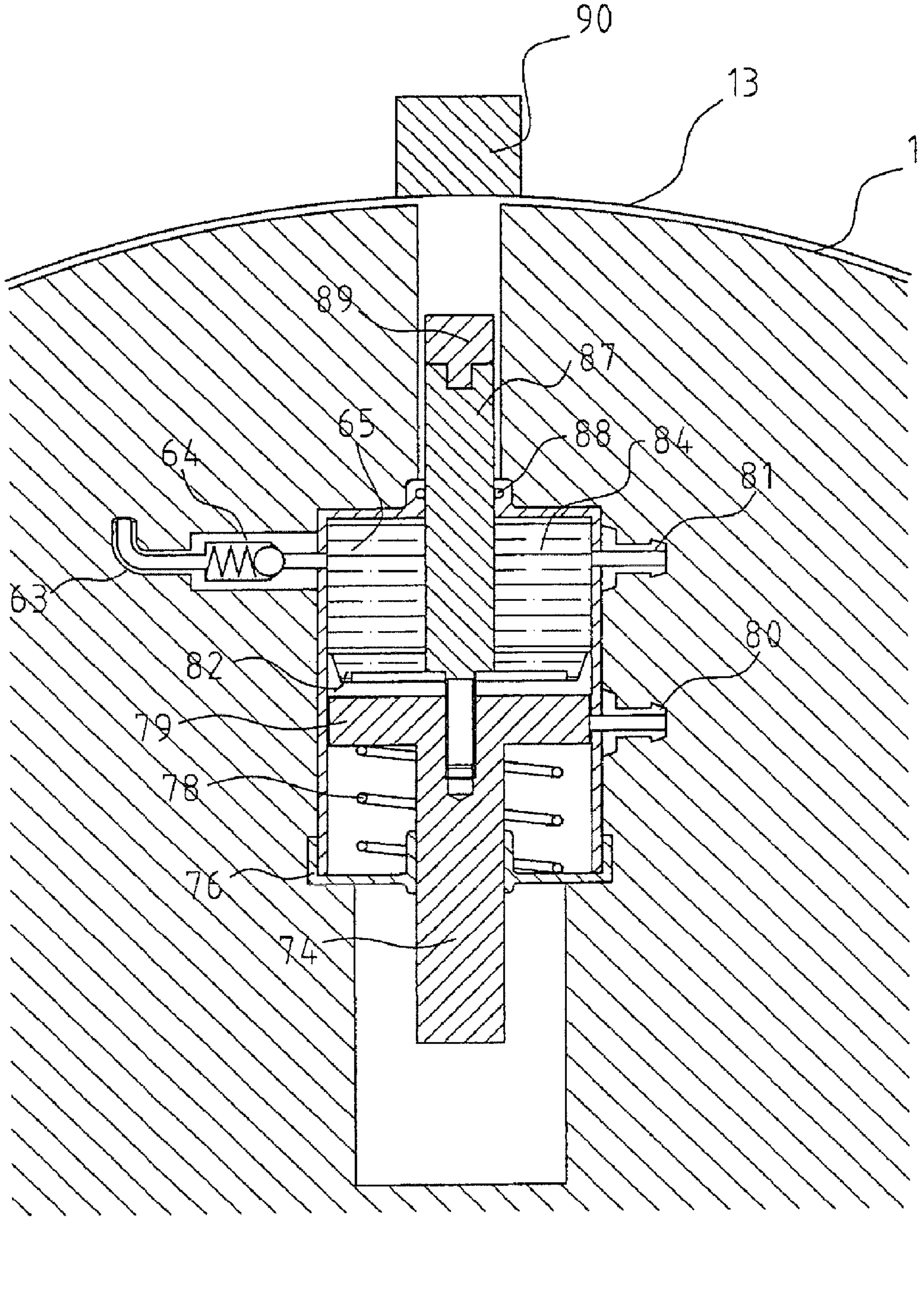

In FIGS. 1 to 6, the fail-safe units 28, which include a small oil reservoir 65 connected to the piston rod 4 by a line 63 through a check valve 64, are shown at the respective rotating pistons 4. The units 28 including the oil reservoir 65 provide protection against oil loss in the oil-filled volumes 55 and 56. Embodiments of these fail-safe units are shown in FIGS. 12 and 13. According to FIG. 12, the unit 28 includes a contact holder 71; contacts 72 and 73 for a signal for switching off the fuel supply in the case of oil loss; a piston skirt 74; a piston guide bush 75; a housing cover 76; a housing 77; a compression spring 78; a piston 79 of sufficient weight to allow to utilize its centrifugal force during rotation; a vent valve 80; a filling valve 81; a piston seal 82; a fasting element 83 for the piston seal; and the flow medium, namely in the example described above, hydraulic oil 84 in the reservoir 65. The fail-safe unit is an oil pressure generator which issues the signal described above if a lack of oil occurs. As appears from the drawing, the operation is as follows: The oil supply in the reservoir 65 keeps filled the oil volumes 55 and 56 of the associated rotating piston 4 through a check valve 85, the compression spring 78 and the centrifugal force of the piston 79 gradually pushing it outwardly when oil is consumed. As a rule, the oil pressure holds the piston 79 against the force of the compression spring 78 inwardly with respect to rotation, that is, it holds it pushed downwardly in the drawing, so that the contacts 72 and 73 do not come into contact. If there is a lack of oil, the compression spring 78 and the centrifugal force push the piston 79 outwardly/upwardly, until finally the contacts 72 and 73 close due to the outward movement of the piston skirt 74 and the safety measures are taken.

The disadvantage of the design of FIG. 12 is the need to provide voltage in the rotor, for example by means of slip rings. FIG. 13 shows, in a comparable view, a fail-safe unit which allows a "current-free" rotor in which the oil-lack signal is magnetically transmitted to the stator. The basic construction is similar to that of FIG. 12 but the piston 79 carries, on the side facing the piston skirt 74, another piston rod 87 which is sealed against the hydraulic-oil reservoir by a sealing ring 88 and carries a magnetic head 89 at its end, which emits outwardly, i.e. upwardly in the drawing, a magnetic field by means of a permanent magnet. On points which the fail-safe units pass during the rotation of the rotor, magnetic-field sensors 90 are located in the stator 3. When oil is lost, the piston rod 87 moves outwardly/upwardly and excites the magnetic-field sensor 90 which issues a signal to the control system which has the fuel injection for the relevant rotating piston switched off. The fuel discharged by the injection pump is now conducted into a return line leading to the reservoir.

For engines having a plurality of rotating pistons such as five or six rotating pistons, of course, information must be input into the control system as to the fact to which rotating piston for which the fuel supply should be switched off the oil-lack signal relates. There are various implementations for an appropriate technique. For example, magnetic-field sensors 9 in the stator 3, whose number coincides with those of the pistons and of the fail-safe units, may be slightly offset in the axial direction in correspondence with the magnetic heads 89 so that each magnetic head has an associated sensor; or there is only one magnetic-field sensor for all magnetic heads 89 and the control system continuously detects the rotational position of the rotor 1 and relates the signals on both sides to each other; finally, each of the magnetic heads at the external surface may comprise a different number of magnetic poles, for example, the magnetic head of the first rotating piston comprises one pole and that of the fifth piston comprises five poles, and the sensor 90, or a part of the control system, may perform an evaluation as to the pulse count of the detected signal. Such a differentiation allows the control system to selectively have the rotating piston run idle, which has indicated the oil lack.

If the lack of oil is a result of a defect, the fuel supply to the relevant rotating piston is switched off through the signal which is in this case issued by the transmitter, whereas the other rotating pistons in their respective ignition phases are still supplied with fuel. That is, the defective rotating piston runs idle, namely practically without friction and without unbalance. Damage to the system is avoided.

Due to the low-friction and low-unbalance run even if the relevant rotating piston is switched off, one rotating piston or some of the rotating pistons may also be "closed down" for the purpose of a part-load operation, by not injecting any fuel when they pass, whereas the other rotating pistons, at least one, continue to operate unchanged.

Figure 14:
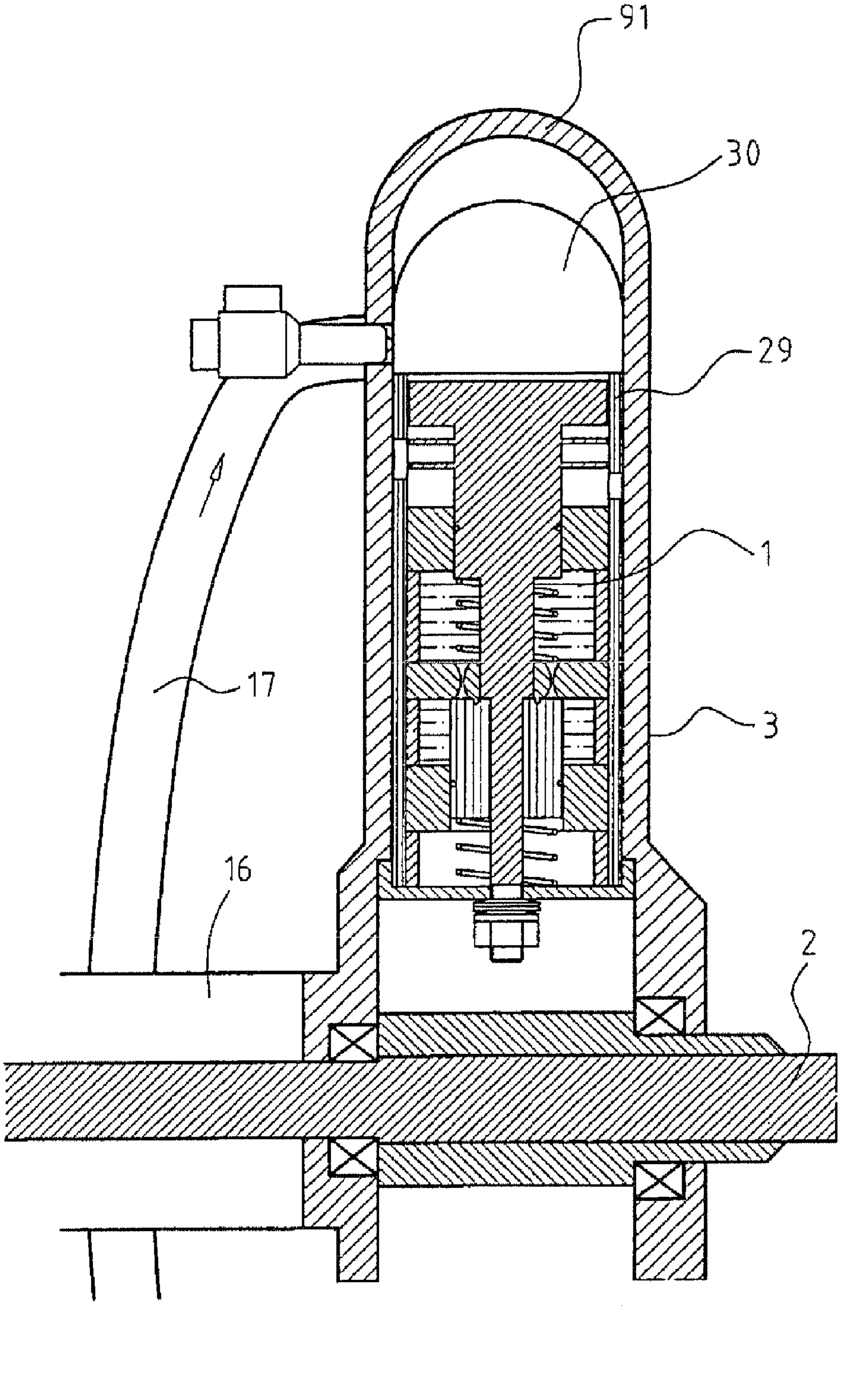
FIG. 14 shows a sectional view, according to FIG. 7, of a slightly modified embodiment of the rotating piston.

FIG. 14 shows a longitudinal view, which approximately corresponds to FIG. 7 but includes a curved outer wall 91 of the stator and an appropriately formed wall extension 30 of the piston housing 29. Basically, the cross-sectional shape of the groove enclosing the combustion chamber on the outside may be modified in various ways and it may be circle-segment-like circular, elliptical-segment-like circular, rectangular, trapezoidal or even irregular, for example. The selection of the shape will be governed by the thermodynamic results, on the one hand, and by the respective production cost, on the other.

Figure 15:
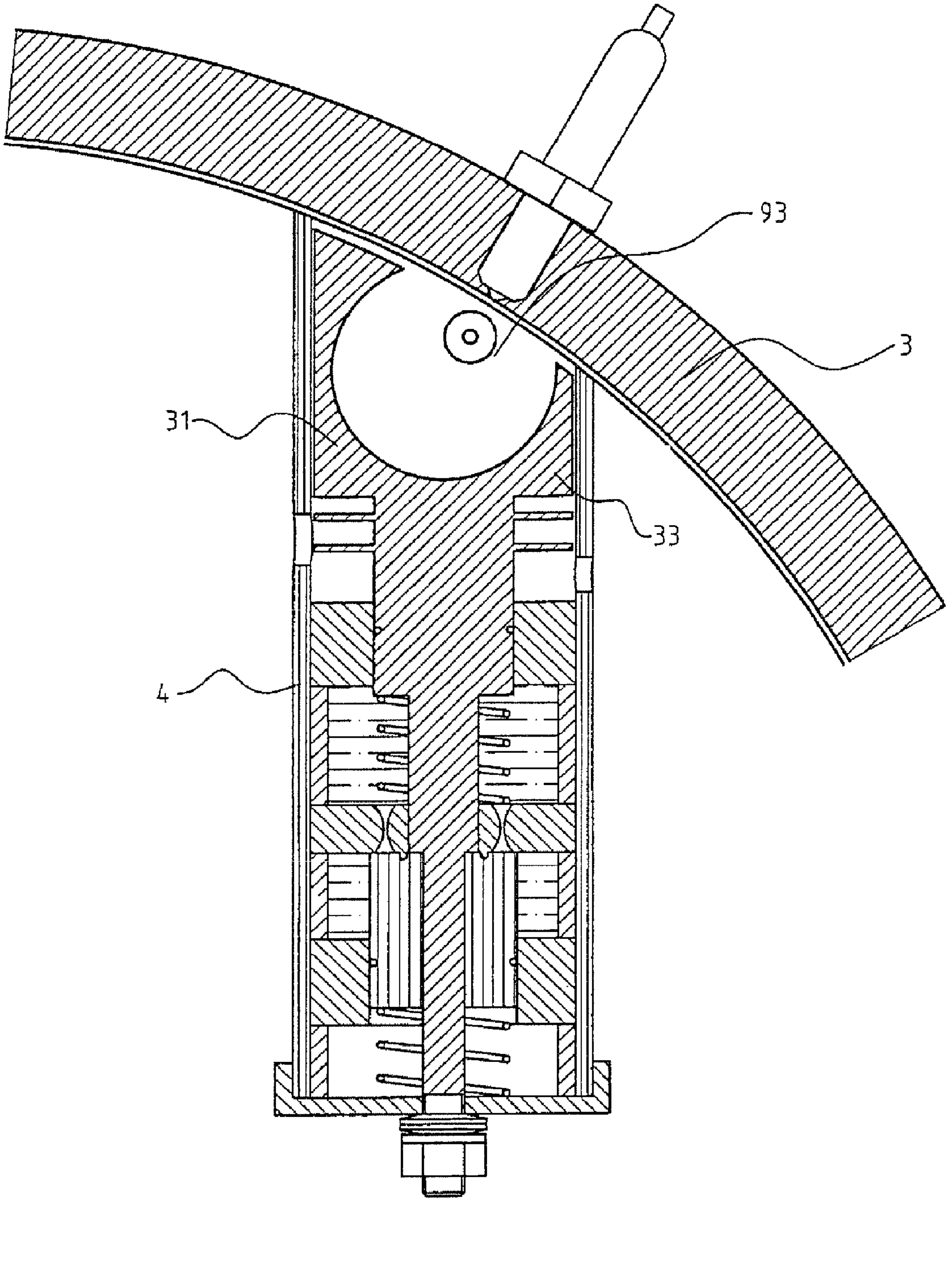
FIG. 15 shows a cross-section of a rotating piston according to a further modified embodiment.

In FIG. 15, a combustion chamber 93 is shown, which is substantially recessed in an outer piston 33 and which has therein the shape of a cylinder segment if the outer piston 33 has a rectangular layout.

These embodiment modifications illustrate the multifarious modifiability of the concept according to the invention.

The invention claimed is:

1. A pressure-operated engine having an annular structure, which comprises a driven shaft (2) extending along the annular axis; an annular housing (11, 13) including a housing wall and at least one rotating piston (4) rotating in said annular housing along a circular path, sealed against said housing, said at least one rotating piston (4) being connected to said driven shaft through a connecting link in a rotationally fixed manner and delimiting in said annular housing a co-rotating ring-segment-like pressure chamber (20) at least on the side located in the direction of rotation as seen from said pressure chamber; connections to a pressure-medium supply (21) and to an exhaust system (24), which are formed in predetermined positions of said annular housing, characterized in that said rotating piston (4) comprises a piston housing (29) and, in said piston housing, an internal piston (31) which is pressed towards said pressure chamber (20) by a pre-stressing force (36, 37), which also supports oneself on said piston housing, said internal piston (31) being linearly displaceable against said pre-stressing force in relation to said piston housing in a longitudinal direction of said piston, the line of displacement of said internal piston (31) tangentially passing the axis of said driven shaft (2) at a distance;

wherein said internal piston (31) loaded by said pre-stressing force (36, 37) is subjected to an attenuation of movement, with respect to said piston housing (29), for its forward stroke and for its return stroke effected by said pre-stressing force;

wherein said pre-stressing force is applied by at least one compression spring (36, 37) and said attenuation of movement is effected by a throttled displacement (in 57) of a flow medium in said piston housing (29); and wherein said internal piston (31) consists of two coaxial piston elements (33, 34) which are fitted, at a distance from each other, to a common piston rod (35) extending along the piston-displacement line, the first, with respect to the rotation of said driven shaft, outer piston element (33) of said two coaxial piston elements (33, 34) being adjacent to said pressure chamber (20), and said internal piston (31) penetrates with its piston rod volumes (55, 56) filled with flow media, which are connected to each other by at least one connecting channel (57) having a reduced flow-through cross-sectional area, during the movement of said internal piston against said pre-stressing force (36, 37) said first, outer piston element (33) penetrating into said first volume (55) and displacing the flow medium out of it and said second, with respect to the rotation of said driven shaft, inner piston element (34) withdrawing from said second volume (56) and vacating flow-medium space.

2. The pressure engine according to claim 1, wherein said second piston element (34) has a closing face which is formed to close said at least one connecting channel (57) in the final position of said internal piston (31) in which it is pushed back by said pre-stressing force (36, 37).

3. The pressure engine according to claim 1, wherein a recess (61) and a protrusion (60) being complementary thereto are formed, on the one hand, on the outer side in relation to the rotation of said driven shaft (2) of said piston element (34) and, on the other, at a face serving as an outer stop face for said second piston element, respectively, which delimits said second volume (56) outwardly.

4. The pressure engine according to claim 1, wherein a fail-safe device (28) including a flow-medium sensor is connected to said first and/or said second volume (55, 56), said flow-medium sensor being connected to a signal transmitter (72, 73; 89, 90) which issues a signal when a lack of flow medium occurs.

5. A pressure-operated engine having an annular structure, which comprises a driven shaft (2) extending along the annular axis; an annular housing (11, 13) including a housing wall and at least one rotating piston (4) rotating in said annular housing along a circular path, sealed against said housing, said at least one rotating piston (4) being connected to said driven shaft through a connecting link in a rotationally fixed manner and delimiting in said annular housing a co-rotating ring-segment-like pressure chamber (20) at least on the side located in the direction of rotation as seen from said pressure chamber; connections to a pressure-medium supply (21) and to an exhaust system (24), which are formed in predetermined positions of said annular housing, characterized in that said rotating piston (4) comprises a piston housing (29) and, in said piston housing, an internal piston (31) which is pressed towards said pressure chamber (20) by a pre-stressing force (36, 37), which also supports oneself on said piston housing, said internal piston (31) being linearly displaceable against said pre-stressing force in relation to said piston housing in a longitudinal direction of said piston, the line of displacement of said internal piston (31) tangentially passing the axis of said driven shaft (2) at a distance;

wherein said annular housing includes an annular groove being open towards the inside of the ring, which is formed for the purpose that said rotating piston (4) may slide therein while said pressure chamber (20) which also rotates is closely sealed; and wherein windows (25) for the flow-through of cooling air are located in said piston housing (29) in an area between said first piston element (33) in its innermost position and said second piston element (34) in its outermost position, and wherein the piston rod (35) carries cooling fins (48) in said area.

6. A pressure-operated engine having an annular structure, which comprises a driven shaft (2) extending along the annular axis; an annular housing (11, 13) including a housing wall and at least one rotating piston (4) rotating in said annular housing along a circular path, sealed against said housing, said at least one rotating piston (4) being connected to said driven shaft through a connecting link in a rotationally fixed manner and delimiting in said annular housing a co-rotating ring-segment-like pressure chamber (20) at least on the side located in the direction of rotation as seen from said pressure chamber; connections to a pressure-medium supply (21) and to an exhaust system (24), which are formed in predetermined positions of said annular housing, characterized in that said rotating piston (4) comprises a piston housing (29) and, in said piston housing, an internal piston (31) which is pressed towards said pressure chamber (20) by a pre-stressing force (36, 37), which also supports oneself on said piston housing, said internal piston (31) being linearly displaceable against said pre-stressing force in relation to said piston housing in a longitudinal direction of said piston, the line of displacement of said internal piston (31) tangentially passing the axis of said driven shaft (2) at a distance;

wherein it is an internal combustion engine and said pressure-medium supply is a compressed-air supply, said pressure engine comprising a fuel supply (22) arranged along said annular housing between said connections (21, 24) for the compressed-air supply and for the exhaust system, wherein said pressure chamber is a combustion chamber; and wherein in said circumferential area of said annular housing (11, 13), at least one working cycle length (5) is arranged, within which said annular housing, along the direction of rotation, comprises said connection in the form of a window (21) for supplying said combustion chamber with compressed air; a recess (22) for fuel injection; a spark plug (23); a connection in the form of a window (24) for removing exhaust gases; and connections in the form of windows (25) for passing through scavenging and cooling fresh air, a distance between said window for supplying compressed air and said recess for fuel injection or said spark plug exceeding the circumferential dimension of said rotating piston (4), a distance between said recess for fuel injection and said spark plug ranging from zero to said circumferential dimension of said rotating piston, said connection for removing exhaust gases having a size in the order of said circumferential dimension of said rotating piston, and said connections for passing through scavenging and cooling fresh air having a size in the direction of rotation in the order of the distance between two rotating pistons in said circumferential area.

7. The pressure engine according to claim 6, wherein said window (21) for supplying the combustion chamber with compressed air, said recess (22) for fuel injection, said connection (24) for removing exhaust gases and said connections (25) for passing through scavenging and cooling fresh air in said housing wall each can be opened and closed by the rotation movement of said rotating piston(s) for passing or blocking.

8. The pressure engine according to claim 6, wherein, from a compressed-air line (17) connected to said window (21) for supplying said combustion chamber (20) with compressed air, from said window (21) or from another window downstream from said window (21), a line (26) branches off, which leads in an afterburning chamber (27) connecting, in relation to flow, to said connection (24) for removing exhaust gases.

9. A pressure-operated engine having an annular structure, which comprises a driven shaft (2) extending along the annular axis; an annular housing (11, 13) including a housing wall and at least one rotating piston (4) rotating in said annular housing along a circular path, sealed against said housing, said at least one rotating piston (4) being connected to said driven shaft through a connecting link in a rotationally fixed manner and delimiting in said annular housing a co-rotating ring-segment-like pressure chamber (20) at least on the side located in the direction of rotation as seen from said pressure chamber; connections to a pressure-medium supply (21) and to an exhaust system (24), which are formed in predetermined positions of said annular housing, characterized in that said rotating piston (4) comprises a piston housing (29) and, in said piston housing, an internal piston (31) which is pressed towards said pressure chamber (20) by a pre-stressing force (36, 37), which also supports oneself on said piston housing, said internal piston (31) being linearly displaceable against said pre-stressing force in relation to said piston housing in a longitudinal direction of said piston, the line of displacement of said internal piston (31) tangentially passing the axis of said driven shaft (2) at a distance;

wherein a plurality of rotating pistons (4) connected to said driven shaft (2) are circumferentially arranged, preferably at equal angular distances, in said ring housing and altogether form said rotor (1); and wherein a plurality of parallel rotors (1) are fitted to said driven shaft (2) in tandem in the axial direction, each of their rotating pistons (4) running in one annular housing (11, 13).

10. A pressure-operated engine having an annular structure, which comprises a driven shaft (2) extending along the annular axis; an annular housing (11, 13) including a housing wall and at least one rotating piston (4) rotating in said annular housing along a circular path, sealed against said housing, said at least one rotating piston (4) being connected to said driven shaft through a connecting link in a rotationally fixed manner and delimiting in said annular housing a co-rotating ring-segment-like pressure chamber (20) at least on the side located in the direction of rotation as seen from said pressure chamber; connections to a pressure-medium supply (21) and to an exhaust system (24), which are formed in predetermined positions of said annular housing, characterized in that said rotating piston (4) comprises a piston housing (29) and, in said piston housing, an internal piston (31) which is pressed towards said pressure chamber (20) by a pre-stressing force (36, 37), which also supports oneself on said piston housing, said internal piston (31) being linearly displaceable against said pre-stressing force in relation to said piston housing in a longitudinal direction of said piston, the line of displacement of said internal piston (31) tangentially passing the axis of said driven shaft (2) at a distance; and wherein a plurality of annular housings (11, 13) are arranged around said driven shaft (2) in tandem in the axial direction, in each of said annular housings (11, 13) rotating one of said rotating pistons (4) connected to said driven shaft through a separate connecting link.

11. A pressure-operated engine having an annular structure, which comprises a driven shaft (2) extending along the annular axis; an annular housing (11, 13) including a housing wall and at least one rotating piston (4) rotating in said annular housing along a circular path, sealed against said housing, said at least one rotating piston (4) being connected to said driven shaft through a connecting link in a rotationally fixed manner and delimiting in said annular housing a co-rotating ring-segment-like pressure chamber (20) at least on the side located in the direction of rotation as seen from said pressure chamber; connections to a pressure-medium supply (21) and to an exhaust system (24), which are formed in predetermined positions of said annular housing, characterized in that said rotating piston (4) comprises a piston housing (29) and, in said piston housing, an internal piston (31) which is pressed towards said pressure chamber (20) by a pre-stressing force (36, 37), which also supports oneself on said piston housing, said internal piston (31) being linearly displaceable against said pre-stressing force in relation to said piston housing in a longitudinal direction of said piston, the line of displacement of said internal piston (31) tangentially passing the axis of said driven shaft (2) at a distance;

wherein it is an internal combustion engine and said pressure-medium supply is a compressed-air supply, said pressure engine comprising a fuel supply (22) arranged along said annular housing between said connections (21, 24) for the compressed-air supply and for the exhaust system, wherein said pressure chamber is a combustion chamber; and wherein a synchronisation control system is provided to control the fuel supply in dependence on the rotary phase of said rotating piston (4), and in the case that a plurality of rotating pistons are present, to selectively lock the fuel supply for some of them.

12. The pressure engine according to claim 4, wherein said oil-filled volumes (55, 56) of each rotating piston (4) are connected to a separate flow-medium reservoir (65) as a fail-safe device (28), which comprises an air and vent valve (80, 81) and is connected to a sensor which issues a signal (by 72, 73; 89, 90) in the case of a loss of flow medium, by which the pressure-medium or fuel supply can be switched off.

13. The pressure engine according to claim 12, wherein said pressure-medium sensor includes, on the one hand, a magnetic head (89) on said rotor (1), which is connected to a displaceable body (79) delimiting a flow-medium reservoir and, on the other, a magnetic-field sensor (90) on said stator (3), which comes into sensing contact with said magnetic head in a predetermined position of said displaceable body, and wherein said magnetic-field sensor is connected to a control system of the piston-selective fuel supply through a signal line.

* * * * *